US012394907B2

(12) United States Patent
Tang

(10) Patent No.: US 12,394,907 B2
(45) Date of Patent: Aug. 19, 2025

(54) ANTENNA ARRAY

(71) Applicant: AUDEN TECHNO CORP., Taoyuan (TW)

(72) Inventor: Hui-Ming Tang, Taoyuan (TW)

(73) Assignee: AUDEN TECHNO CORP., Taoyuan (TW)

( * ) Notice: Subject to any disclaimer, the term of this patent is extended or adjusted under 35 U.S.C. 154(b) by 263 days.

(21) Appl. No.: 18/137,522

(22) Filed: Apr. 21, 2023

(65) Prior Publication Data

US 2024/0356232 A1 Oct. 24, 2024

(51) Int. Cl.

*H01Q 9/06* (2006.01)
*H01Q 5/15* (2015.01)
*H01Q 9/04* (2006.01)
*H01Q 21/00* (2006.01)

(52) U.S. Cl.

CPC ............... *H01Q 9/065* (2013.01); *H01Q 5/15* (2015.01); *H01Q 9/0435* (2013.01); *H01Q 21/0075* (2013.01)

(58) Field of Classification Search

CPC ...... H01Q 9/065; H01Q 5/15; H01Q 21/0075; H01Q 9/0435; H01Q 21/065

See application file for complete search history.

(56) References Cited

U.S. PATENT DOCUMENTS

| | | | | |
|---|---|---|---|---|
| 6,184,828 | B1 * | 2/2001 | Shoki | H01Q 3/26 342/372 |
| 2006/0007044 | A1 * | 1/2006 | Crouch | H01Q 9/0435 343/906 |
| 2016/0261039 | A1 * | 9/2016 | Parsche | H01Q 9/0442 |
| 2021/0210867 | A1 * | 7/2021 | Panther | H01Q 9/0435 |
| 2022/0320603 | A1 * | 10/2022 | Xie | H01M 50/204 |

FOREIGN PATENT DOCUMENTS

| | | |
|---|---|---|
| CN | 106450714 A | 2/2017 |
| CN | 114464995 A | 5/2022 |

* cited by examiner

*Primary Examiner* — Hai V Tran

(74) *Attorney, Agent, or Firm* — Li & Cai Intellectual Property (USA) Office

(57) ABSTRACT

An antenna array includes a common carrier and four microstrip antennas disposed on the common carrier. The common carrier has a first direction and a second direction that is perpendicular to the first direction. The four microstrip antennas are arranged in a matrix along the first direction and the second direction. Each of the four microstrip antennas includes an antenna structure and a power divider. The antenna structure includes a circular body and two circular feeding points that are surrounded by the circular body and do not connect to the circular body. The power divider can feed signals to the two circular feeding points. Any two adjacent ones of the antenna structures along the second direction have a two-fold rotational symmetry relationship, and any two adjacent ones of the power dividers along the first direction or the second direction have a mirror-symmetrical relationship.

7 Claims, 11 Drawing Sheets

ANTENNA ARRAY

FIELD OF THE DISCLOSURE

The present disclosure relates to an antenna, and more particularly to an antenna array.

BACKGROUND OF THE DISCLOSURE

Since microstrip antennas can be printed directly on a circuit board and are low in cost, microstrip antennas are widely used in electronic products (e.g., mobile phones). In order to optimize an operation of a conventional dual-feed microstrip antenna (e.g., to avoid interference from components within the electronic product), the conventional dual-feed microstrip antenna is designed with factors such as isolation and axial ratio in mind. However, since the development of the conventional dual-feed microstrip antenna has reached maturity, it is difficult for the conventional dual-feed microstrip antenna to provide better isolation and a reduced axial ratio.

SUMMARY OF THE DISCLOSURE

In response to the above-referenced technical inadequacy, the present disclosure provides an antenna array.

In order to solve the above-mentioned problems, one of the technical aspects adopted by the present disclosure is to provide an antenna array. The antenna array includes a common carrier and four microstrip antennas. The common carrier includes a first plate surface and a second plate surface opposite to each other. The common carrier has a first direction and a second direction that is perpendicular to the first direction. The four microstrip antennas are spaced apart from each other and disposed on the common carrier. The four microstrip antennas are arranged in a matrix along the first direction and the second direction. Each of the four microstrip antennas includes an antenna structure and a power divider. The power divider is disposed on the second plate surface and electrically coupled to the antenna structure. The power divider is configured to feed signals to the two circular feeding points, so to generate a phase difference of 90 degrees between the two circular feeding points. Any two adjacent ones of the antenna structures along the second direction have a two-fold rotational symmetry relationship, and any two adjacent ones of the power dividers along the first direction or the second direction have a mirror-symmetrical relationship.

In one of the possible or preferred embodiments, the in each of the four microstrip antennas, the circular body has a first center and a radius, each of the two circular feeding points has a second center, and a shortest distance between the second center and the first center is less than ½ of the radius.

In one of the possible or preferred embodiments, the common carrier includes a first layer, a second layer, and at least one interlayer that is between the first layer and the second layer. A surface of the first layer that is away from the second layer is defined as the first plate surface, and a surface of the second layer that is away from the first layer is defined as the second plate surface. Each of the four microstrip antennas includes a ground element disposed on the second layer or the at least one interlayer.

In one of the possible or preferred embodiments, each of the first layer and the second layer is a circuit board, and the at least one interlayer is an air medium.

In one of the possible or preferred embodiments, each of the first layer, the second layer and the at least one interlayer is a circuit board.

In one of the possible or preferred embodiments, the at least one interlayer has two through holes, and each of the four microstrip antennas includes two conductive posts. The two conductive posts pass through the two through holes, so that two ends of each of the two conductive posts are electrically coupled to the power divider and one of the two circular feeding points.

In one of the possible or preferred embodiments, a first extension line is configured to pass through the second center of one of the two circular feeding points and the first center of the circular body, a second extension line is configured to pass through the second center of another of the two circular feeding points and the first center of the circular body, and the first extension line and the second extension line have a 90 degree angle there-between.

In one of the possible or preferred embodiments, an area of each of the two circular feeding points is less than or equal to ¼ of an area of the circular body.

Therefore, in the antenna array provided by the present disclosure, by virtue of "any two adjacent ones of the antenna structures along the second direction having a two-fold rotational symmetry relationship," and "any two adjacent ones of the power dividers along the first direction or the second direction having a mirror image relationship," the antenna array can simplify a structure thereof and greatly increase a space where components can be laid out.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
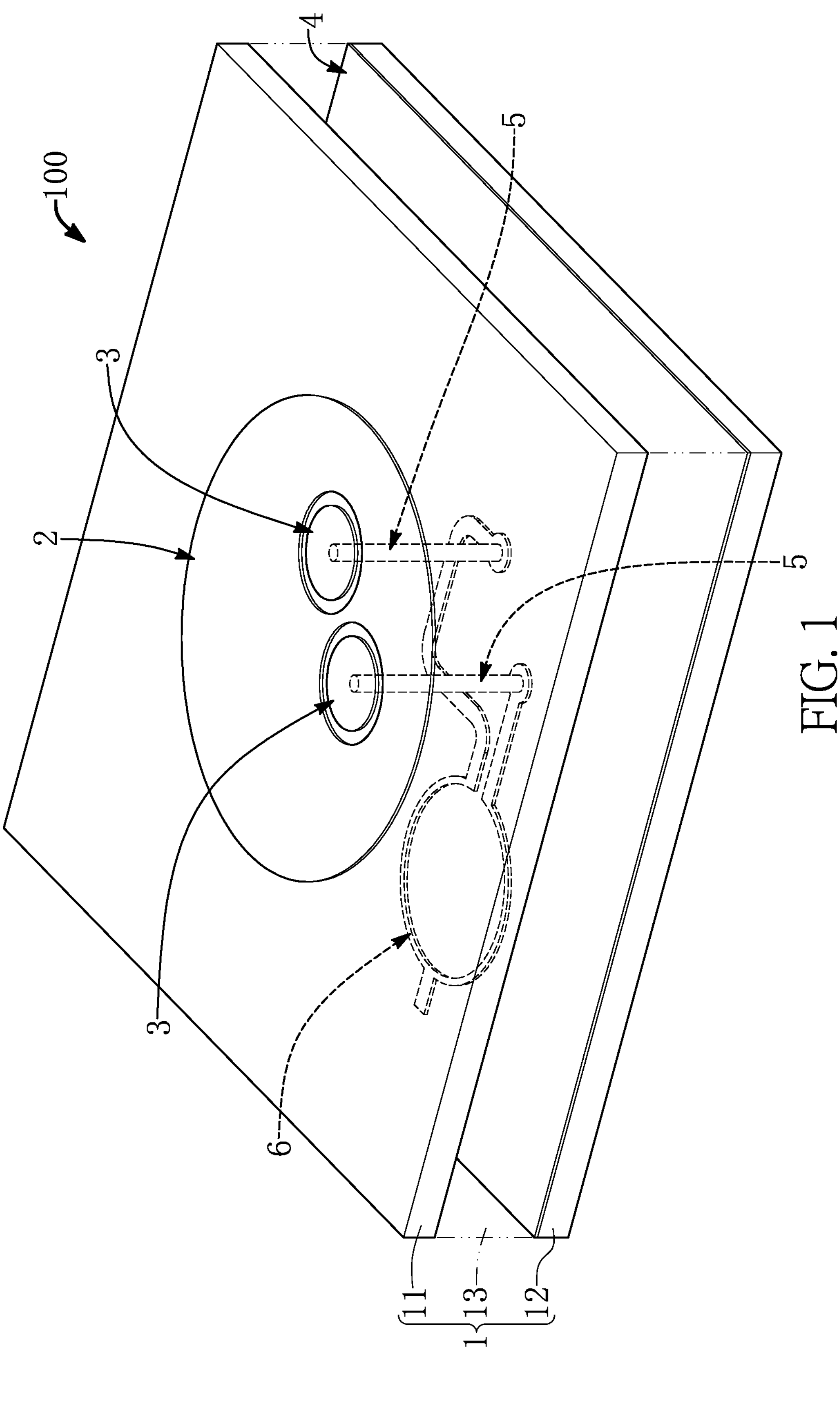
FIG. 1 is a schematic perspective view of an antenna array according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
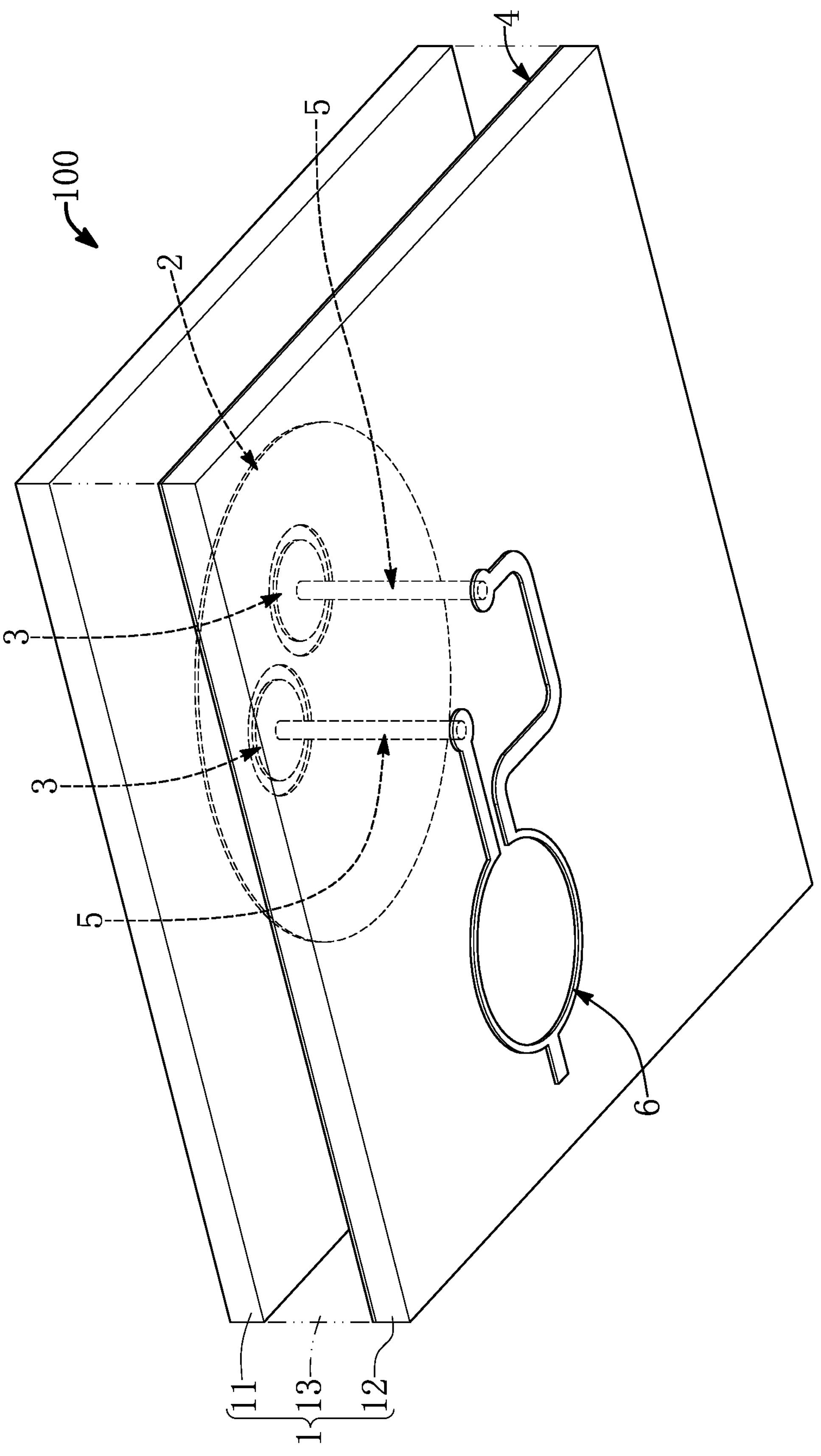
FIG. 2 is another schematic perspective view of the antenna array according to the first embodiment of the present disclosure.

Referring to FIG. 1 to FIG. 7, a first embodiment of the present disclosure provides a microstrip antenna 100 that is suitable for a broadband. As shown in FIG. 1 and FIG. 2, the microstrip antenna 100 includes an insulating carrier 1, a circular body 2, two circular feeding points 3, a grounding element 4, and two conductive posts 5 disposed on the insulating carrier 1, and a power divider that is electrically coupled to the two circular feed points 3. The following description describes the structure and connection relationship of each component of the microstrip antenna 100.

Figure 5:
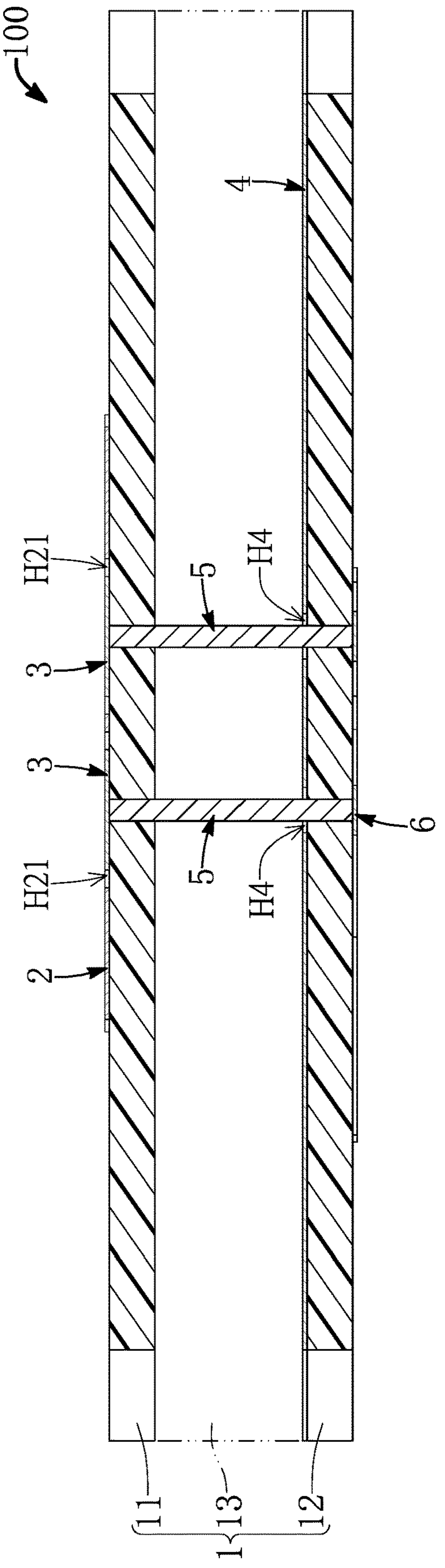
FIG. 5 is a schematic cross-sectional view taken along line V-V of FIG. 3.

Referring to FIG. 1, FIG. 2, and FIG. 5, the insulating carrier 1 in the present embodiment is a printed circuit board with a multilayer structure, and the insulating carrier 1 includes a first layer 11, a second layer 12, and an interlayer 13 that is located between the first layer 11 and the second layer 12.

In a practical application, the first layer 11 and the second layer 12 may be physical components (e.g., circuit boards), and the first layer 11 and the second layer 12 can be supported by an insulating support (not shown), so that the first layer 11 and the second layer 12 are spaced apart from each other to have the interlayer 13 as an air medium.

Figure 3:
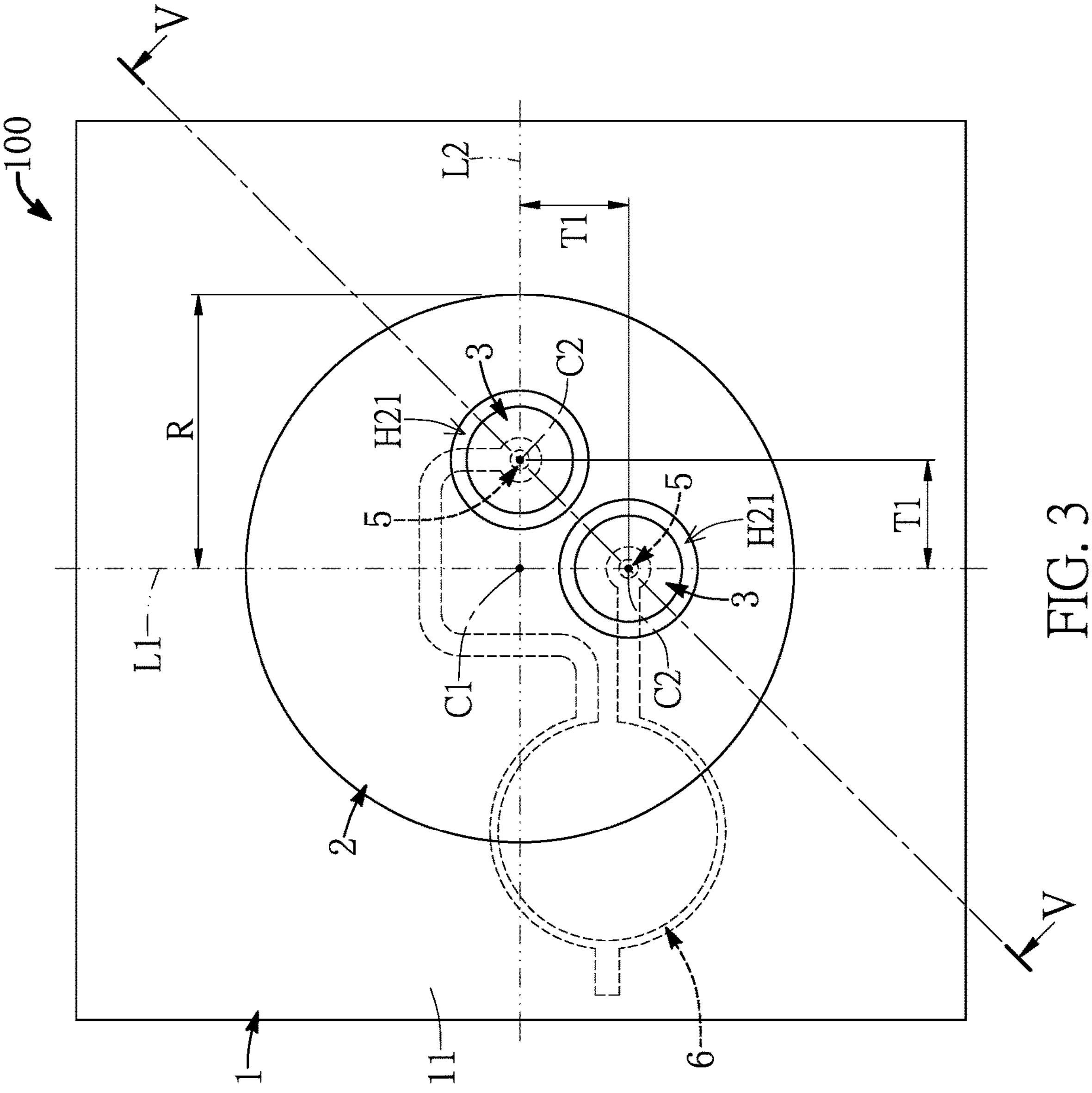
FIG. 3 is a schematic top view of the antenna array according to the first embodiment of the present disclosure.

Referring to FIG. 1, FIG. 3, and FIG. 5, the circular body 2 in the present embodiment is a conductive material that is in a shape of a sheet (e.g., a copper foil). The circular body 2 is disposed on a side of the first layer 11 away from the second layer 12, and the circular body 2 has a first center C1 and a radius R.

In addition, the circular body 2 also has two circular through holes H21, and a part of the first layer 11 can be exposed from the two circular through holes H21. Areas of the two circular through holes H21 must be greater than areas of the two circular feeding points 3, so that the two circular through holes H21 can be respectively used to accommodate the two circular feeding points 3. Moreover, the two circular feeding points 3 are respectively arranged at central regions of the two circular through holes H21, so that the two circular feeding points 3 are surrounded by the circular body 2 and are not connected, and the two circular feeding points 3 can produce a capacitive effect with the circular body 2.

It should be noted that each of the two circular feeding points 3 in the present embodiment is also a conductive material that is in the shape of a sheet (e.g., a copper foil). In order to ensure that an isolation of the capacitive effect can be improved and an axial ratio of the capacitive effect can be reduced, a positional relationship between the two circular feeding points 3 and the circular main body 2 is particularly important. Specifically, each of the circular feeding points 3 has a second center C2, and the second center C2 of each of the two circular feeding points 3 and the first center C1 of the circular body 2 have a shortest distance T1 there-between that is preferably less than ½ of the radius R. In other words, positions of the two circular feeding points 3 are adjacent to the center of the circular body 2.

In a preferred implementation, an area of each of the two circular feeding point 3 is preferably less than or equal to ¼ of an area of the circular body 2, so as to ensure that the capacitive effect between the two circular feeding points 3 and the circular body 2 is appropriate. Furthermore, a first extension line L1 can pass through the second center C2 of one of the two circular feeding points 3 and the first center C1 of the circular body 2, a second extension line L2 can pass through the second center C2 of another of the two circular feeding points 3 and the first center C1 of the circular body 2, and the first extension line L1 and the second extension line L2 have a 90 degree angle therebetween.

Referring to FIG. 1 and FIG. 5, the two conductive posts 5 in the present embodiment are cylindrical structures, and the two conductive posts 5 are installed between the first layer 11 and the second layer 12. The two conductive posts 5 correspond in position to the two circular feeding points 3, one of two ends of the two conductive posts 5 can pass through the first layer 11 to electrically couple to the two circular feeding points 3, and another of the two ends of the two conductive posts 5 can pass through the second layer 12 to electrically couple to the power divider 6.

The grounding element 4 in the present embodiment is also a conductive material that is in the shape of a sheet (e.g., a copper foil), and the grounding element 4 is disposed on a side of the second layer 12 facing the first layer 11. The grounding member 4 has two avoidance holes H4, and the two avoidance holes H4 correspond in position to the two conductive posts 5, so that the grounding element 4 does not connected to the two conductive posts 5. In addition, the ground element 4 may preferably completely cover the side of the second layer 12 facing the first layer 11, but the present disclosure is not limited thereto.

Figure 4:
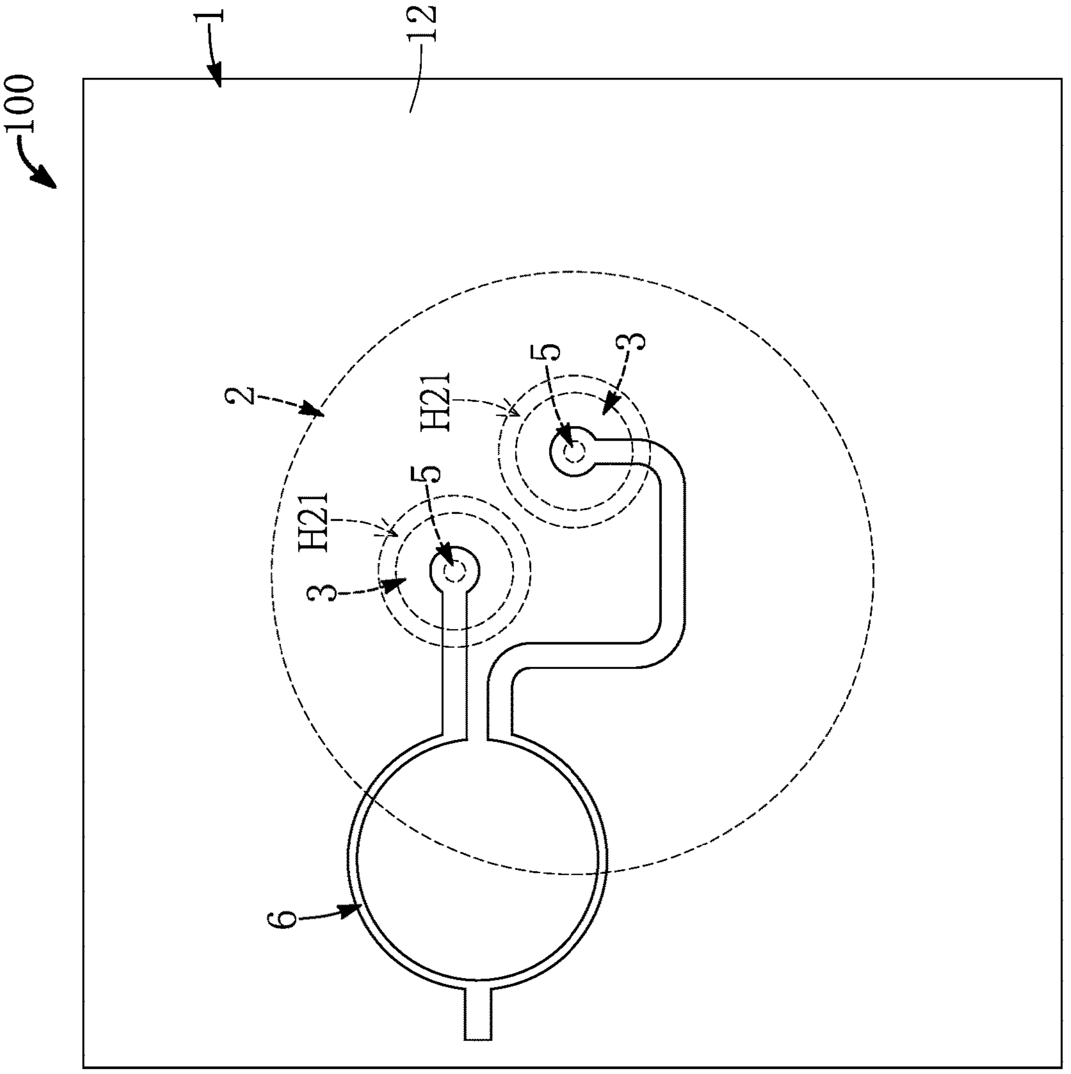
FIG. 4 is a schematic bottom view of the antenna array according to the first embodiment of the present disclosure.

Referring to FIG. 2, FIG. 4, and FIG. 5, the power divider 6 in the present embodiment may be a Wilkinson power divider, and can be used to receive signals from a beamforming integrated circuit (i.e., BFIC). The power divider 6 is disposed on the side of the second layer 12 away from the first layer 11, and the power divider 6 can be electrically coupled to the two circular feeding points 3 by another of the two ends of the two conductive posts 5, so as to generate a phase difference of 90 degrees between the two circular feeding points 3. Accordingly, the microstrip antenna 100 can generate a circularly polarized field pattern, and can also cooperate with the beamforming integrated circuit to realize beam control.

Figure 6:
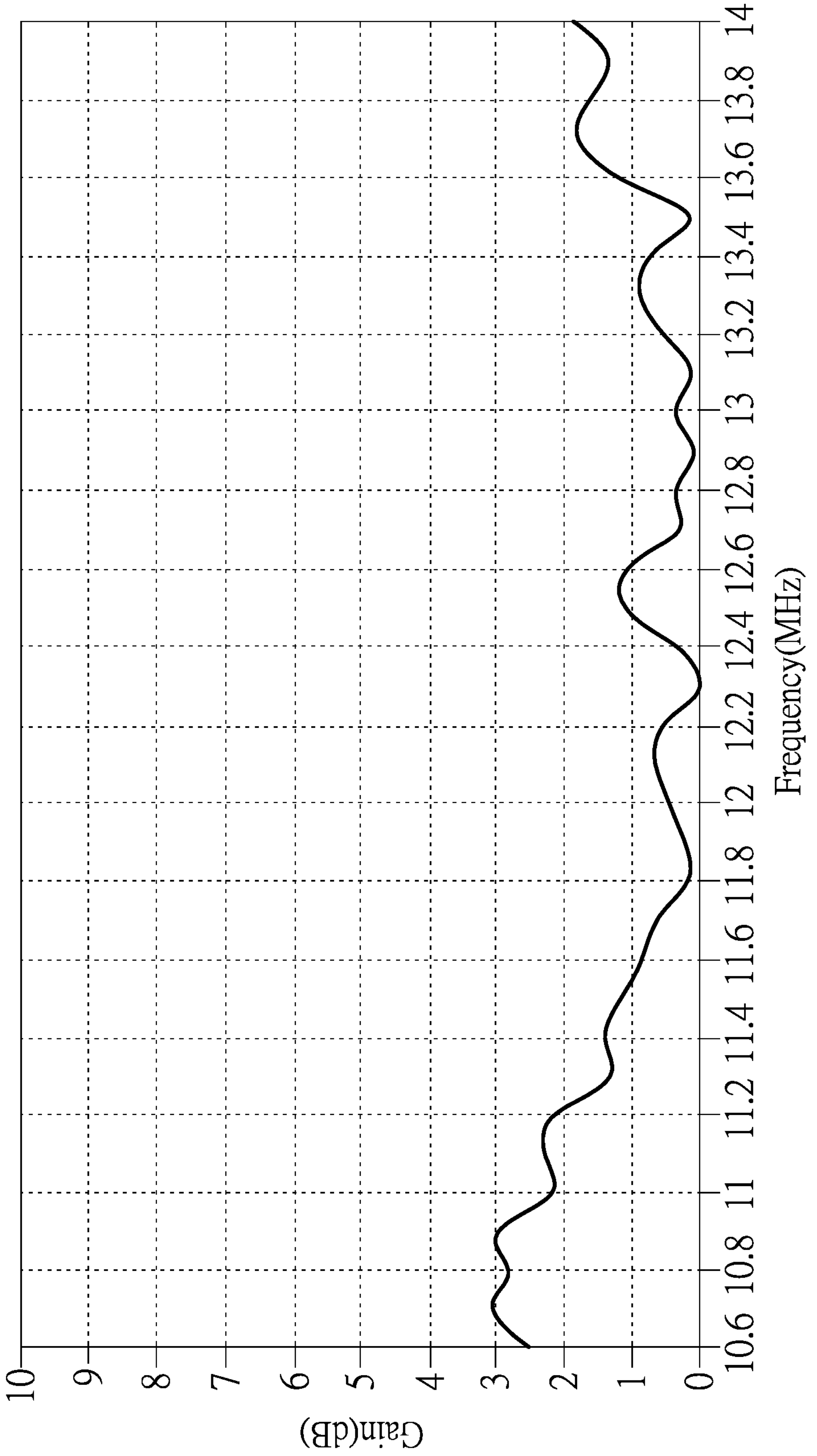
FIG. 6 is a diagram of axial ratio data of the antenna array according to the first embodiment of the present disclosure.
Figure 7:
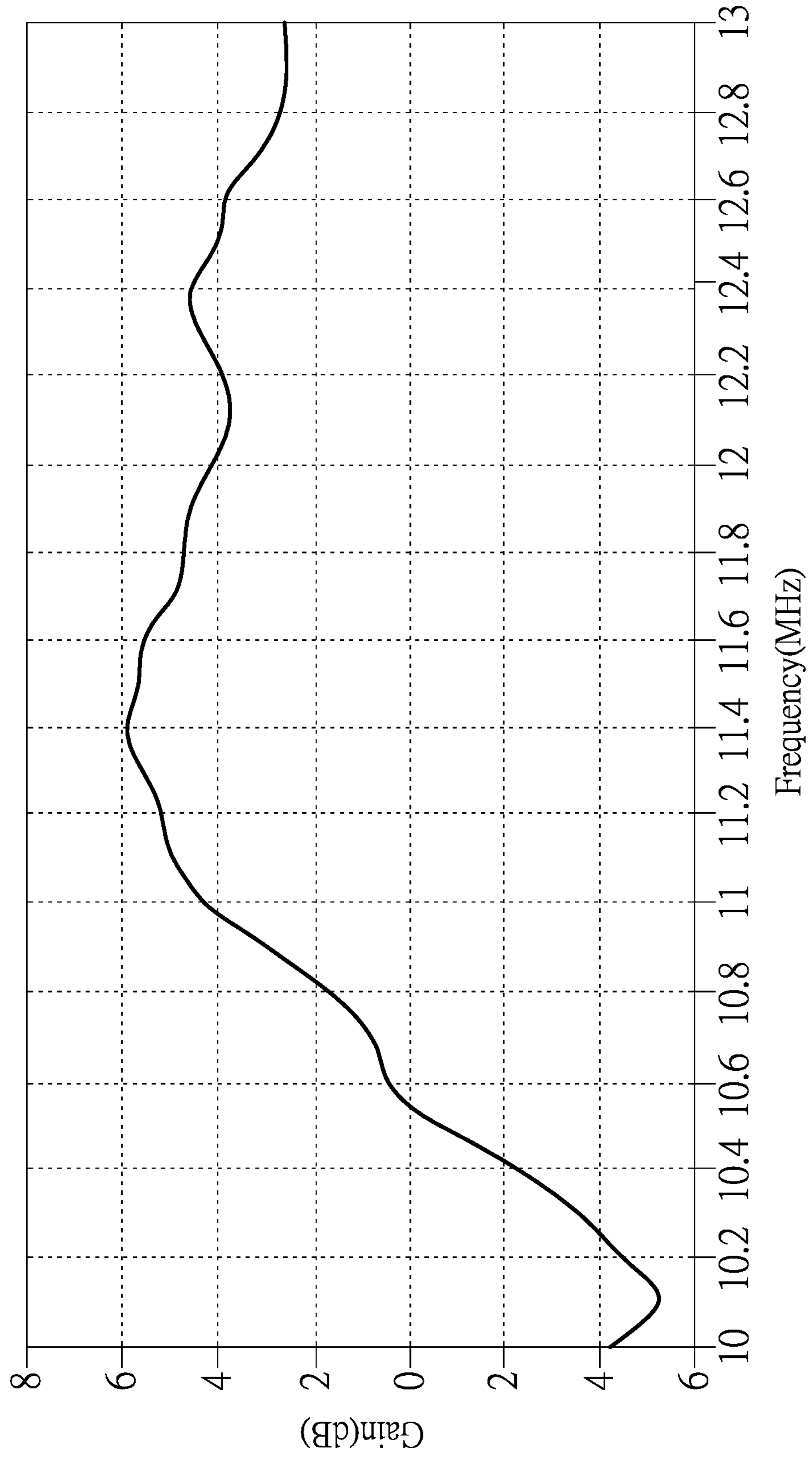
FIG. 7 is a diagram of peak gain data of the antenna array according to the first embodiment of the present disclosure.

It should be noted that, FIG. 6 is a diagram of axial ratio data of the antenna array according to the first embodiment of the present disclosure, and FIG. 7 is a diagram of peak gain data of the antenna array according to the first embodiment of the present disclosure. It can be known from the axial ratio data that when the microstrip antenna 100 is within a range from 10.6 MHz to 14 MHz, an axial ratio of the microstrip antenna 100 can be less than 3 dB. In addition, when the microstrip antenna 100 is within a range from 11.6 MHz to 13.6 MHz, the axial ratio of the microstrip antenna 100 can be less than 1.2 dB. Moreover, it can be known from the peak gain data that when the microstrip antenna 100 is within a range from 10.9 MHz to 13 MHz, a peak gain of the microstrip antenna 100 can be greater than 2 dB. In other words, the microstrip antenna 100 of the present disclosure not only has an advantage of low axial ratio, but also has an effect of increasing the gain value.

Second Embodiment

Figure 8:
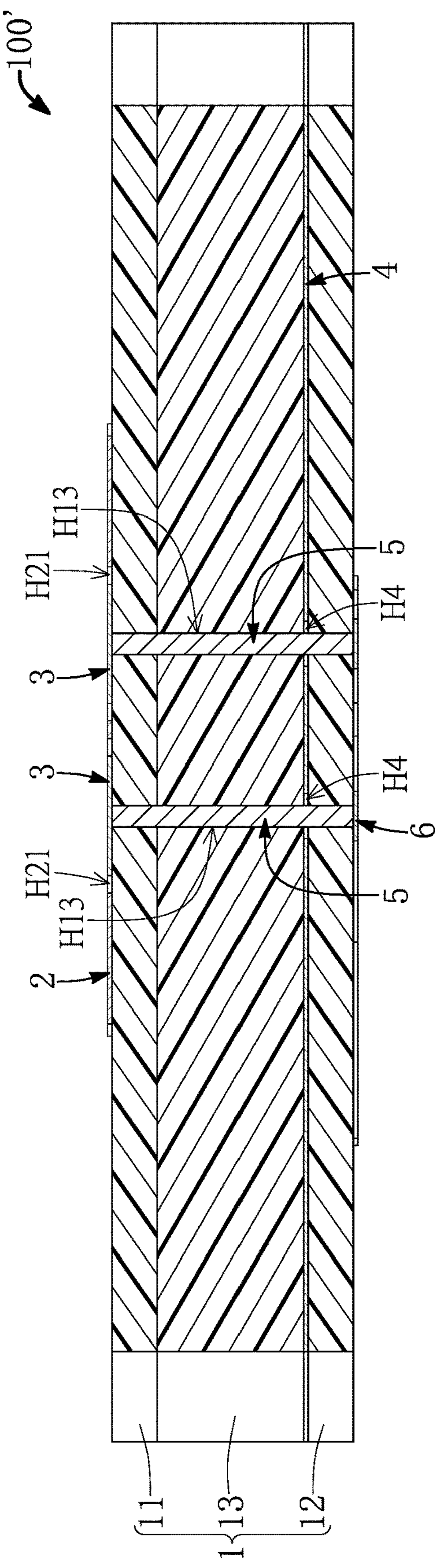
FIG. 8 is a schematic cross-sectional view of the antenna array according to a second embodiment of the present disclosure.

Referring to FIG. 8, the second embodiment provides a microstrip antenna 100'. The present embodiment is similar to the first embodiment, and the similarities therebetween will not be repeated herein. The main differences between the present embodiment and the first embodiment are described as follows.

As shown in FIG. 8, each of the first layer 11, the second layer 12 and the interlayer 13 in the present embodiment is a circuit board, and the grounding element 4 is disposed on a surface of the interlayer 13 facing the first layer 11. In addition, the interlayer 13 also has two through holes H13, and the two through holes H13 correspond in position to the two conductive posts 5, so that the two conductive posts 5 can penetrate the interlayer 13. Each of the conductive posts 5 in the present embodiment may also be a via hole, but the present disclosure is not limited thereto.

Accordingly, when the interlayer 13 is a (high-frequency) circuit board, the interlayer 13 can be used as a power supply and a control circuit. In addition, the microstrip antenna 100' of the present embodiment is directly formed by stacking multiple circuits during a manufacturing process, so that the microstrip antenna 100' can also be more convenient to manufacture than the microstrip antenna 100 of the first embodiment (especially, a manufacture of an array antenna).

In addition, it should be noted that, in another embodiment of the present disclosure (not shown), the insulating carrier 1 may also include a plurality of interlayers 13 and a plurality of grounding elements 4, a part of the interlayers 13 may be a circuit board, and another part of the interlayers 13 may be an air medium. The grounding elements 4 are disposed on the interlayers 13 that are the circuit boards.

Naturally, the interlayers 13 may all be circuit boards, but the present disclosure is not limited thereto. In other words, the quantity of the interlayer 13 of the insulating carrier 1 and the ground member 4 may be at least one.

Third Embodiment

Figure 9:
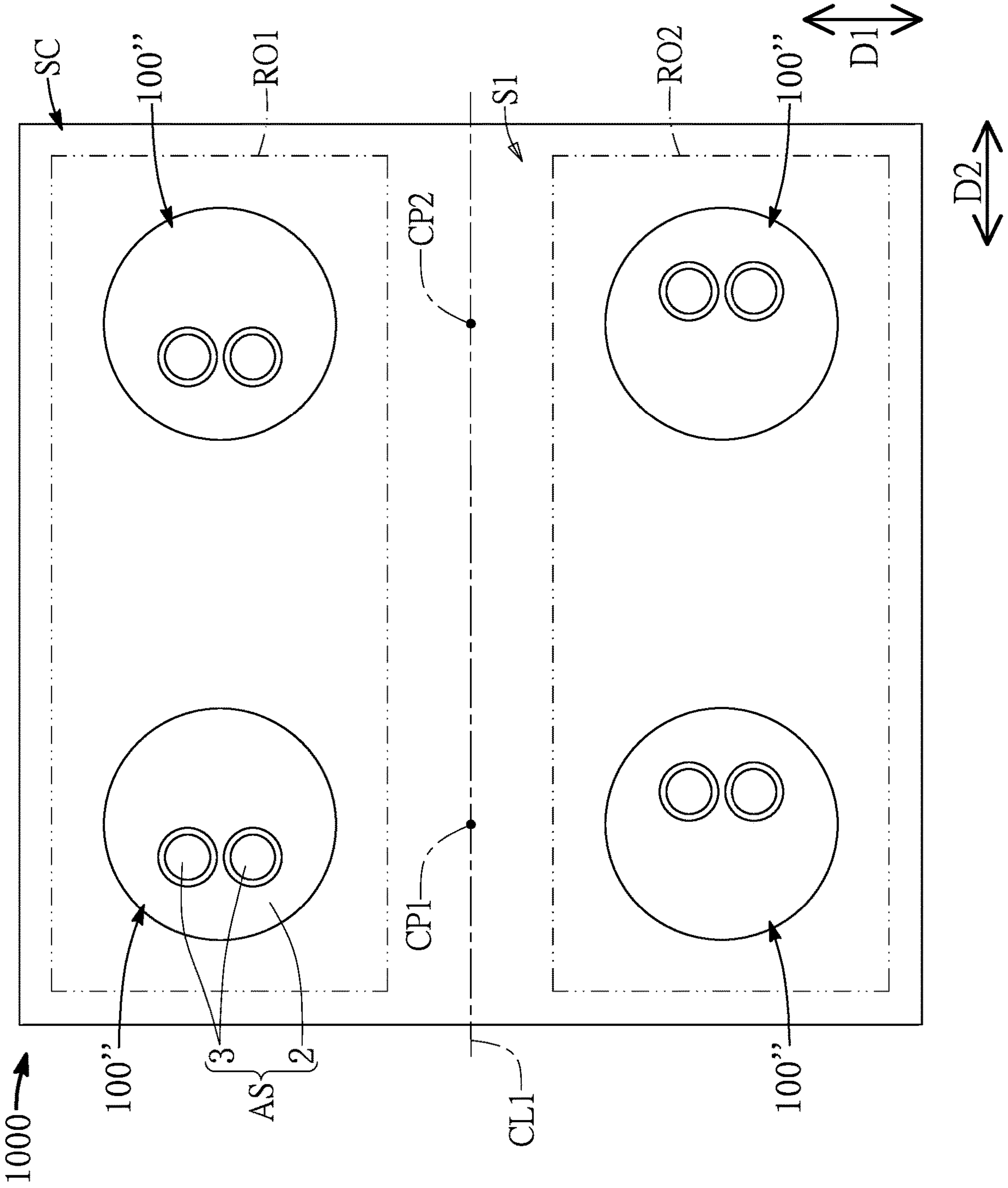
FIG. 9 is a schematic top view of the antenna array according to a third embodiment of the present disclosure.
Figure 10:
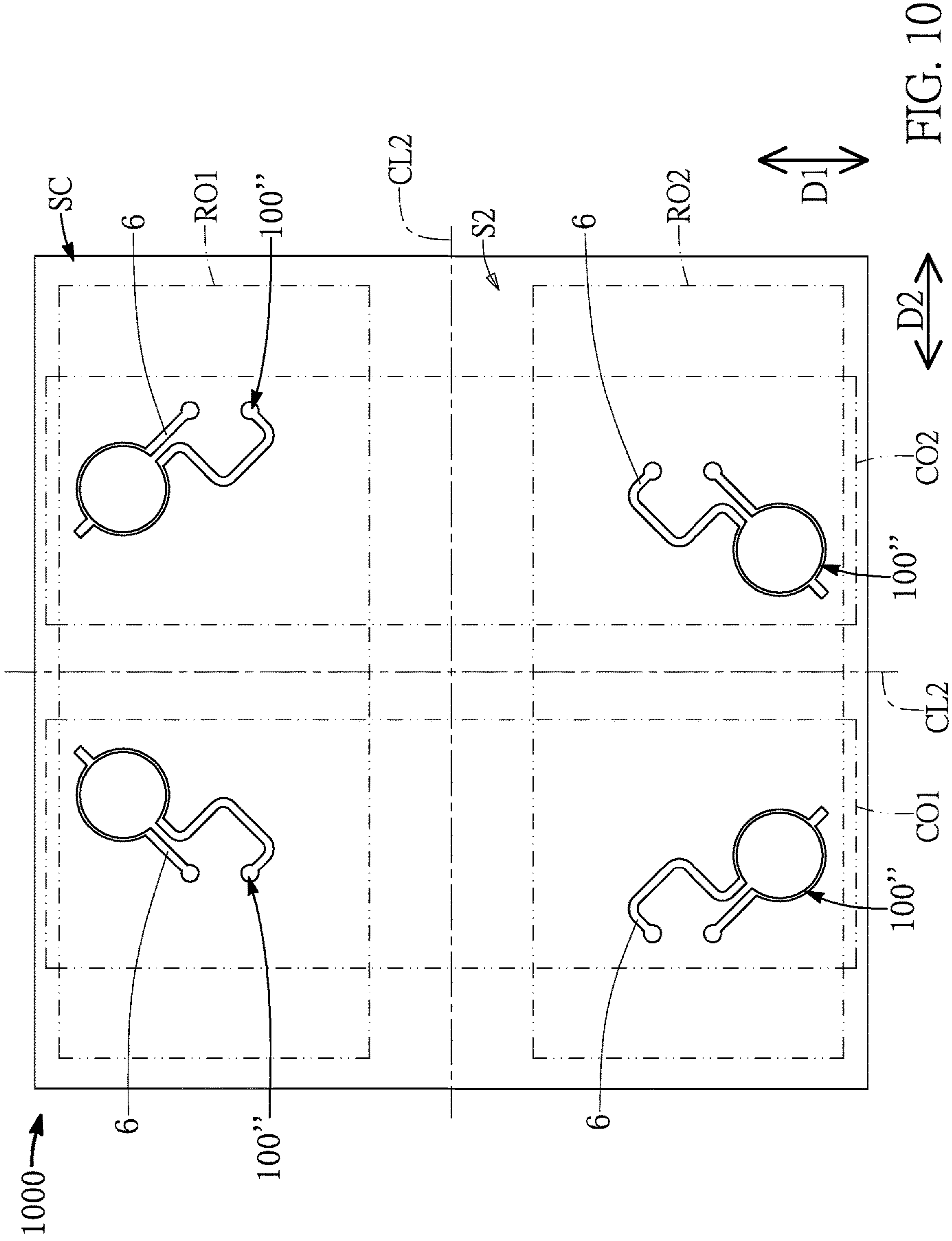
FIG. 10 is a schematic bottom view of the antenna array according to the third embodiment of the present disclosure.
Figure 11:
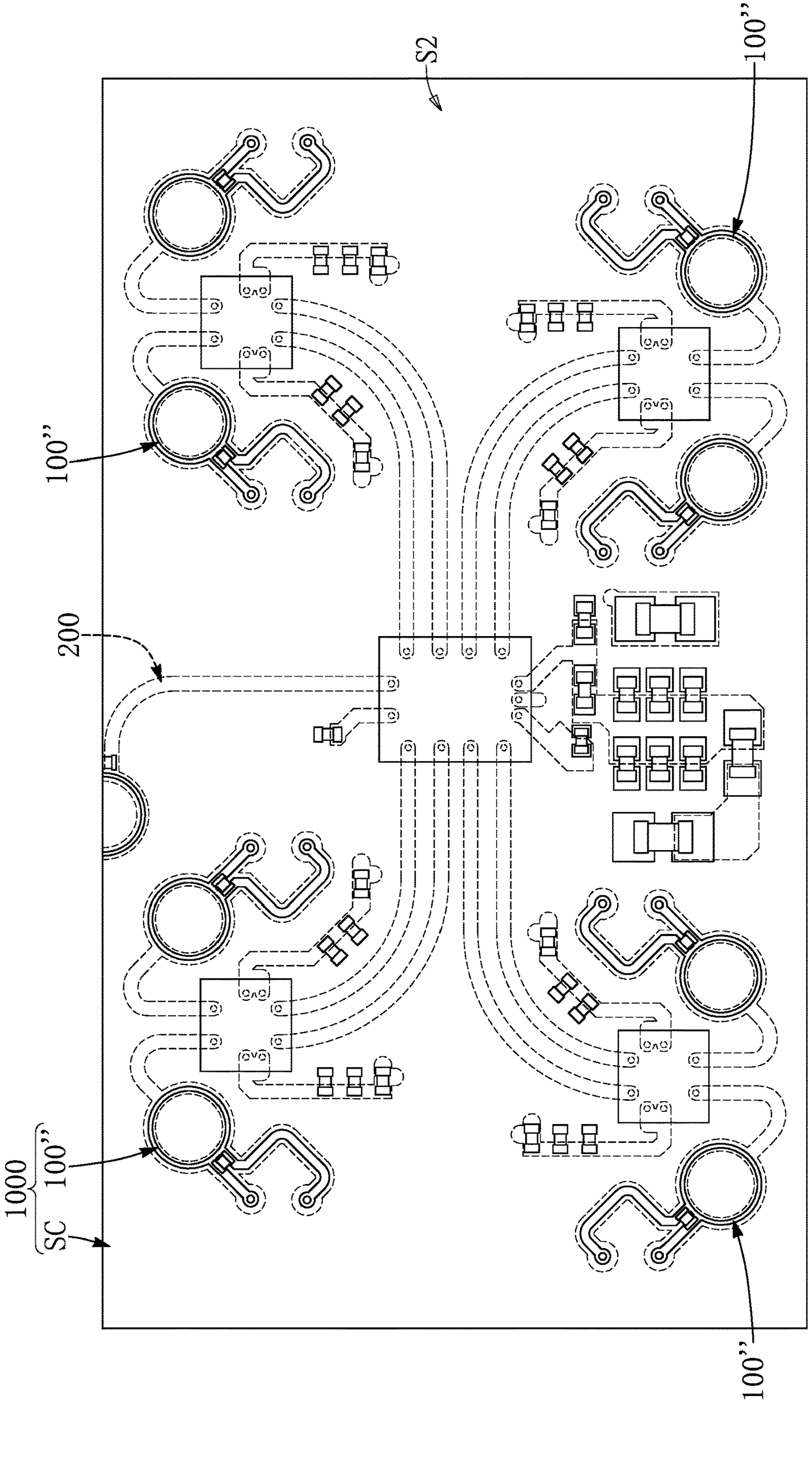
FIG. 11 is a schematic view showing a circuit being connected to the antenna array according to the third embodiment of the present disclosure.

Referring to FIG. 9 to FIG. 11, a third embodiment of the present disclosure provides an antenna array 1000, and the antenna array 1000 includes a common carrier SC and four microstrip antennas 100" disposed on the common carrier SC. The following description describes the structure and connection relation of each component of the antenna array 1000.

Referring to FIG. 9 and FIG. 10, the common carrier SC including a first plate surface S1 and a second plate surface S2 opposite to each other, and the common carrier SC has a first direction D1 and a second direction D2 that is perpendicular to the first direction D1. In the present embodiment, the common carrier SC can be exemplified to be a plurality of insulating carriers 1 of the first embodiment or the second embodiment. That is to say, the common carrier SC of the present embodiment is similar to the insulating carriers 1 of the first embodiment or the second embodiment, and the similarities between the present embodiment and the first embodiment or the second embodiment will not be repeated herein.

In other words, the common carrier SC also includes the first layer 11, the second layer 12, and the interlayer 13 between the first layer 11 and the second layer 12 (as shown in FIG. 5 or FIG. 8). The surface of the first layer 11 that is away from the second layer 12 is defined as the first plate surface S1, and the surface of the second layer 12 that is away from the first layer 11 is defined as the second plate surface S2.

Referring to FIG. 9 and FIG. 10, each of the four microstrip antennas 100" in the present embodiment can be exemplified to be the microstrip antennas 100, 100' of the first embodiment or the second embodiment. That is to say, each of the four microstrip antennas 100" of the present embodiment is similar to the microstrip antennas 100, 100' of the first embodiment or the second embodiment, and the similarities between the present embodiment and includes the circular body 2, the grounding element 4, the two conductive posts 5, and the power divider 6 (as shown in FIG. 1), so that the similarities between the present embodiment and the first embodiment or the second embodiment will not be repeated herein. For convenience of description, the circular body 2 and the two circular feeding points 3 of each of the four microstrip antennas 100" can be further defined as an antenna structure AS.

It should be noted that, in order to reduce an area that is occupied by a circuit 200 connected to the four microstrip antennas 100" on the common carrier SC (as shown in FIG. 11), the four microstrip antennas 100'" can be configured in a manner described below.

Specifically, the four microstrip antennas 100" are spaced apart from each other on the common carrier SC, and the four microstrip antennas 100" are arranged in a matrix along the first direction D1 and the second direction D2. In addition, in the first plate surface S1, any two adjacent ones of the antenna structures AS along the second direction D2 have a two-fold rotational symmetry relationship. In the second plate surface S2, any two adjacent ones of the power dividers 6 along the first direction D1 or the second direction D2 have a mirror symmetrical relationship.

For example, as shown in FIG. 9, the first plate surface S1 has a first centerline CL1 parallel to the second direction D2. The first plate surface S1 has a first rotation point CP1 between two microstrip antennas 100" in a first column CO1, and the first centerline CL1 (and a connecting line of the centers of two circular bodies 2) passes through the first rotation point CP1. Moreover, the first plate surface S1 also has a second rotation point CP2 between two microstrip antennas 100" in a second column CO2, and the first centerline CL1 (and a connecting line of the centers of two circular bodies 2) passes through the second rotation point CP2.

When the two circular feeding points 3 of the two microstrip antennas 100" in a first row RO1 respectively rotate 180 degrees with the first rotation point CP1 and the second rotation point CP2, the two circular feeding points 3 of the two microstrip antennas 100" in the first row RO1 can be overlapped with the two circular feeding points 3 of the two microstrip antennas 100" in a second row RO2.

Furthermore, as shown in FIG. 10, the second plate surface S2 has two second centerline CL2 parallel to the first direction D1 and the second direction D2. The two power dividers 6 in the first row RO1 and the two power dividers 6 in the second row RO2 are arranged symmetrically with one of the two second center line CL2 parallel to the second direction D2 as the axis of symmetry, and the two power dividers 6 in the first column CO1 and the two power dividers 6 in the second column CO2 are arranged symmetrically with one of the two second center line CL2 parallel to the first direction D1 as the axis of symmetry.

Naturally, in another embodiment of the present disclosure (not shown), the antenna array 1000 may include a 4M number of microstrip antennas 100", where M is a positive integer.

Beneficial Effects of the Embodiments

In conclusion, in the antenna array provided by the present disclosure, by virtue of "any two adjacent ones of the antenna structures along the second direction having a two-fold rotational symmetry relationship," and "any two adjacent ones of the power dividers along the first direction or the second direction having a mirror image relationship," the antenna array can simplify a structure thereof and greatly increase a space where components can be laid out.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna array, comprising:

a common carrier including a first plate surface and a second plate surface opposite to each other, wherein the common carrier has a first direction and a second direction that is perpendicular to the first direction;

four microstrip antennas spaced apart from each other and disposed on the common carrier, wherein the four microstrip antennas are arranged in a matrix along the first direction and the second direction, and each of the four microstrip antennas includes:

an antenna structure including:

a circular body disposed on the first plate surface; and two circular feeding points disposed on the first plate surface and surrounded by the circular body, wherein the two circular feeding points do not connect to the circular body;

a power divider disposed on the second plate surface and electrically coupled to the antenna structure, wherein the power divider is configured to feed signals to the two circular feeding points, so as to generate a phase difference of 90 degrees between the two circular feeding points;

wherein any two adjacent ones of the antenna structures along the second direction have a two-fold rotational symmetry relationship, and any two adjacent ones of the power dividers along the first direction or the second direction have a mirror-symmetrical relationship;

wherein, in each of the four microstrip antennas, the circular body has a first center and a radius, each of the two circular feeding points has a second center, and a shortest distance between the second center and the first center is less than ½ of the radius.

2. The antenna array according to claim 1, wherein the common carrier includes a first layer, a second layer, and at least one interlayer that is between the first layer and the second layer, wherein a surface of the first layer that is away from the second layer is defined as the first plate surface, and a surface of the second layer that is away from the first layer is defined as the second plate surface, and wherein each of the four microstrip antennas includes a ground element disposed on the second layer or the at least one interlayer.

3. The antenna array according to claim 2, wherein each of the first layer and the second layer is a circuit board, and the at least one interlayer is an air medium.

4. The antenna array according to claim 2, wherein each of the first layer, the second layer and the at least one interlayer is a circuit board.

5. The antenna array according to claim 4, wherein the at least one interlayer has two through holes, and each of the four microstrip antennas includes two conductive posts, and wherein the two conductive posts pass through the two through holes, so that two ends of each of the two conductive posts are electrically coupled to the power divider and one of the two circular feeding points.

6. The antenna array according to claim 1, wherein a first extension line is configured to pass through the second center of one of the two circular feeding points and the first center of the circular body, a second extension line is configured to pass through the second center of another of the two circular feeding points and the first center of the circular body, and the first extension line and the second extension line have a 90 degree angle there-between.

7. The antenna array according to claim 1, wherein an area of each of the two circular feeding points is less than or equal to ¼ of an area of the circular body.

* * * * *